United States Patent
Levi et al.

(10) Patent No.: US 9,798,802 B2
(45) Date of Patent: Oct. 24, 2017

(54) SYSTEMS AND METHODS FOR EXTRACTION OF POLICY INFORMATION

(71) Applicant: AVG Netherlands B.V., Amsterdam (NL)

(72) Inventors: Shaul Levi, Amsterdam (NL); Valery Kholodkov, Amsterdam (NL); Yuval Ben-Itzhak, Brno (CZ)

(73) Assignee: Avast Software B.V., Schiphol (NL)

( * ) Notice: Subject to any disclaimer, the term of this patent is extended or adjusted under 35 U.S.C. 154(b) by 90 days.

(21) Appl. No.: 13/826,776

(22) Filed: Mar. 14, 2013

(65) Prior Publication Data

US 2013/0297626 A1 Nov. 7, 2013

Related U.S. Application Data

(60) Provisional application No. 61/614,933, filed on Mar. 23, 2012.

(51) Int. Cl.
*G06F 17/30* (2006.01)
*G06K 9/00* (2006.01)

(52) U.S. Cl.
CPC .. *G06F 17/30719* (2013.01); *G06F 17/30289* (2013.01); *G06F 17/30707* (2013.01); *G06K 9/00442* (2013.01)

(58) Field of Classification Search
CPC ......... G06F 17/30719; G06F 17/30707; G06F 17/30289
See application file for complete search history.

(56) References Cited

U.S. PATENT DOCUMENTS

| | | | |
|---|---|---|---|
| 7,089,226 B1 | 8/2006 | Dumais | |
| 8,166,406 B1* | 4/2012 | Goldfeder | G06F 21/6263 709/224 |
| 2006/0075122 A1* | 4/2006 | Lindskog | G06F 21/6263 709/228 |
| 2006/0095521 A1* | 5/2006 | Patinkin | 709/206 |
| 2011/0161168 A1* | 6/2011 | Dubnicki | 705/14.49 |

OTHER PUBLICATIONS

Mita K. Dalal et al., "Automatic Text Classification: A Technical Review, International Journal of Computer Applications", Aug. 2, 2011, pp. 37-40.
Daya C. Wimalasuriya et al., "Components for Information Extraction: Ontology-Based Information Extractors and Generic Platforms", Oct. 26-30, 2010, pp. 9-18.
International Search Report, Application No. PCT/IB2013/000995, dated Jan. 8, 2014.

* cited by examiner

*Primary Examiner* — Scott A Waldron
(74) *Attorney, Agent, or Firm* — Kramer Levin Naftalis & Frankel LLP

(57) ABSTRACT

In a system for extracting policy information from text, a processor analyzes if the text is relevant to a top-level category, and then determines if at least a portion of the text is relevant to categories and subcategories within a taxonomy of categories and subcategories related to the top-level category. If at least a portion of the text is determined to be relevant to the category/subcategory, a classifier extracts policy information associated with the category/subcategory. Using text that includes a known policy the classifiers can be trained to correctly recognize categories/subcategories, and the values associated therewith.

32 Claims, 5 Drawing Sheets

SYSTEMS AND METHODS FOR EXTRACTION OF POLICY INFORMATION

CROSS-REFERENCE TO RELATED APPLICATIONS

This application claims priority to and the benefit of U.S. Provisional Patent Application No. 61/614,933, filed on Mar. 23, 2012, which is incorporated herein by reference in its entirety.

FIELD OF THE INVENTION

The invention relates generally to the field of information processing, and, more specifically, to extraction and presentation of policy information.

BACKGROUND

Users often encounter information such as policies (e.g., privacy and/or data-security policies), terms and conditions of a contract (e.g., in software product licenses, leases for cars and apartments), etc. during everyday activities. These activities include surfing the web and visiting sites that have implemented certain policies. Such information, e.g., legal information embedded in sources such as websites and other non-electronic and/or electronic documents can be difficult to locate and/or analyze. Therefore, user may be unaware of such policies, terms, etc. Also, in many situations the user cannot continue interaction with a website unless the user accepts the website's policy. Though the website may direct a user to the website's policy, user may not have understood the user's obligations and any rights granted to the website. As such, in order to continue interacting with an on-line destination (e.g., a website) the user may unknowingly consent to any requirements imposed by the policies and/or terms of the on-line destination, or may unknowingly violate such requirements.

SUMMARY OF THE INVENTION

Various embodiments of the present invention facilitate automatic extraction of policy information such as privacy policies, terms of service, software licenses, etc., from text in electronic form, e.g., sentences and/or documents. The extracted policy may be presented to a user in a clear and concise manner, when the user visits an on-line destination. Thus, the user may provide an informed consent to the policy or may decline to accept the policy. The extraction is performed by an automatic legal advisory system, which may be a software system, a software application, a software component, or a device. The extraction of policy information is performed using a hierarchy of classifiers, each one utilizing a machine learning algorithm and/or natural language processing. Exemplary machine learning algorithms include, but are not limited to multinomial logistic regression, word profile similarity comparison, and naive Bayes classifier.

Various embodiments of an automatic legal advisory system allow for automatic extraction of policy information from legal documents in electronic form. Unlike some known systems, the different embodiments do not determine whether a document or text complies with a provided policy. Instead, the nature of the policy is determined from a document/text. To this end, an exemplary automatic legal advisory system enables categorization of a legal document based on pre-determined categories, and processing of the document so as to notify the content of each category to a user. In general, the exemplary system first determines if the text to be analyzed is relevant to a certain top-level category such as privacy policy, lease, license, etc. Such determination can be made using machine learning and/or natural language processing. Once the top-level category is determined, a taxonomy of categories associated with the top-level category is selected. For example, the categories associated with privacy policy may be collecting personally-identifiable information, collecting non-personally-identifiable information, sharing collected information, and allowing opt-out.

One classifier may determine if a portion of the text is relevant to a category such as collecting personally-identifiable information. If a portion of the text is determined to be relevant, the classifier may extract specific information such as whether personally-identifiable information is collected or is not collected. If it is determined that personally-identifiable information is collected, the same or one or more other classifiers may extract information related to various subcategories. The subcategories related to the category collecting personally-identifiable information may include, for example, collection of name, collection of address, collection of email address, and collection of IP address. Various classifiers may determine whether or not name, address, email address, IP address, etc. are collected.

The classifiers used for the extraction of policy information may be pre-trained using any publicly or privately available information, as well as using expert opinions. The classifiers may also be trained during the process of extracting policy information from a document.

Once the policy information is extracted, it is made available to a user, including, but not limited to, a website visitor, a user of an application, or a user of a device. For example, when a user accesses a privacy domain (such as a website, an application, or a device) that is covered by a legal document, the user is presented with policy information extracted from the legal document and/or information derived from extracted policy information.

The user may be requested to make a decision based on the presented information, upon which the automatic legal advisory system may perform certain activities or abstain therefrom, such as limiting the access to a website or its part, limiting the access to an application or its part, and/or limiting the access to a device or its components. The advisory system may also undertake other activities.

The issuer of a legal document may participate in the advisory process by submitting corrections related to any false positives in policy information extracted from the legal document. These corrections may be integrated into the training data used for training the classifiers. Retraining after integrating the corrections into training data can improve the accuracy of the information extraction process.

Accordingly, in one aspect various embodiments feature a method of extracting policy information from text. The text may include a sentence or a document. The method includes analyzing, by a first processor, if the text is relevant to a top-level category. If the text is determined to be relevant to the top-level category, the method includes determining by the first processor if at least a portion of the text is relevant to a category within a taxonomy of categories related to the top-level category. If at least a portion of the text is determined to be relevant to the category, the method further includes extracting from the relevant portion of the text, using a first classifier, policy information associated with the category.

In some embodiments, the method further includes extracting from the relevant portion of the text, using a second classifier, policy information associated with a subcategory within the taxonomy. The subcategory is related to the category for which information was extracted. The top-level category may include one or more of a privacy policy, a lease agreement, and a license. The category may include one or more of collecting personally-identifiable information, collecting non-personally-identifiable information, sharing the collected information, and allowing opt-out. The subcategories related to collecting personally-identifiable information may include one or more of collection of name, collection of address, collection of email address, and collection of IP address.

In some embodiments, the analyzing step, the determining step, or both may include machine learning and/or natural language processing by the first processor. The first classifier may employ one or more of multinomial logistic regression, word profile similarity comparison, and naive Bayes classification, k-nearest neighbor classification, and maximal likelihood based classification. The classifier is not limited to these techniques, however, and any machine learning technique, natural language processing technique, and/or another statistical classification technique may be used for classification. The method may further include storing the extracted policy information in a database, and transmitting the stored policy information, e.g., to a user. The database may include a local database, a distributed database, or both.

In another aspect various embodiments feature a method of responding to policy information extracted from text. The method includes receiving extracted policy information, and the extraction is performed by analyzing, by a first processor, if the text is relevant to a top-level category. If the text is determined to be relevant to the top-level category, the extraction of policy information further includes determining by the first processor if at least a portion of the text is relevant to a category within a taxonomy of categories related to the top-level category. Moreover, if at least a portion of the text is determined to be relevant to the category, the extraction includes identifying from the relevant portion of the text, using a classifier, policy information associated with the category. The method also includes displaying, by a second processor, the received extracted policy information to a user and receiving an instruction from the user in response to the displayed policy information. In addition, the method includes taking an action by the second processor in response to the received instruction.

In some embodiments, the second processor is the first processor. The action taken may include limiting access to at least a part of a source associated with the text. The source may include one or more of a website, an application, and a device. In some embodiments, the method includes training or adjusting the classifier if at least one of the portions of the text determined to be relevant to the category and the extracted policy information is not related to the category.

In another aspect various embodiments feature a method of training a classifier for extracting policy information from text. The method includes extracting using a classifier, first data from first text comprising known policy information associated with a category. The first data and the known policy information are compared, and the classifier is adjusted if the first data and the known policy information are substantially different. The training method may further include testing, using the classifier, if second text lacking policy information associated with the category is nevertheless determined to be relevant to the category, and adjusting the classifier such that the second text is not determined to be relevant to the category. The first and second texts may be portions of a single piece of text such as a document.

In another aspect various embodiments feature a system for extracting policy information from text. The system includes a storage medium and a processor. The processor is configured as an analyzer adapted for analyzing if the text is relevant to a top-level category. The analyzer is also adapted for determining, if the text is determined to be relevant to the top-level category, if at least a portion of the text is relevant to a category within a taxonomy of categories related to the top-level category. The processor is also configured as a first classifier adapted for extracting from the relevant portion of the text policy information associated with the category, if at least a portion of the text is determined to be relevant to the category.

In some embodiments, the processor is further configured as a second classifier adapted for extracting from the relevant portion of the text policy information associated with a subcategory within the taxonomy. The subcategory is related to the category. The text from which policy information is extracted may include a sentence and/or a document. The analyzer may be adapted for natural language processing, and the first classifier may employ one or more of multinomial logistic regression, word profile similarity comparison, naive Bayes classification, k-nearest neighbor classification, and maximal likelihood based classification. The classifiers and the analyzers are not limited to the exemplary techniques described herein, however, and any machine learning, natural language processing, and/or statistical classification technique may be used for classification and/or analysis of text.

In some embodiments, the top-level category may include one or more of a privacy policy, a lease agreement, and a license, and the category may include one or more of collecting personally-identifiable information, collecting non-personally-identifiable information, sharing collected information, and allowing opt-out. In some embodiments, the subcategory is related to collecting personally-identifiable information, and the subcategory includes one or more of collection of name, collection of address, collection of email address, and collection of IP address.

The processor may be further configured for storing the extracted policy information in a database, and transmitting the stored policy information, e.g., to a user's computing and/or communication device. The database may include a local database, a distributed database, or both. In some embodiments, the processor is further configured for displaying the extracted policy information to a user, receiving an instruction from the user in response to the displayed policy information, and taking an action in response to the received instruction. The action taken may include limiting access to at least a part of a source associated with the text, and the source may include one or more of a website, an application, and a device. Additionally or in the alternative, the processor may be configured for adjusting the first classifier if at least one of the portion of the text determined to be relevant to the category and the extracted policy information is not related to the category.

In yet another aspect, various embodiments feature a system that includes a storage medium and a processor, for training a classifier for extracting policy information from text. The processor is configured as a classifier for extracting first data from first text including known policy information associated with a category. The processor is also configured as a comparator for comparing the first data and the known policy information, and as an adjuster for adjusting the classifier if the first data and the policy information are substantially different. The processor may also be configured for testing, using the classifier, if second text lacking policy information associated with the category is nevertheless determined to be relevant to the category. The classifier may be adjusted if the second text is determined to be relevant to the category. The first and second texts may be portions of a single piece of text such as a document.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DESCRIPTION

Figure 1:
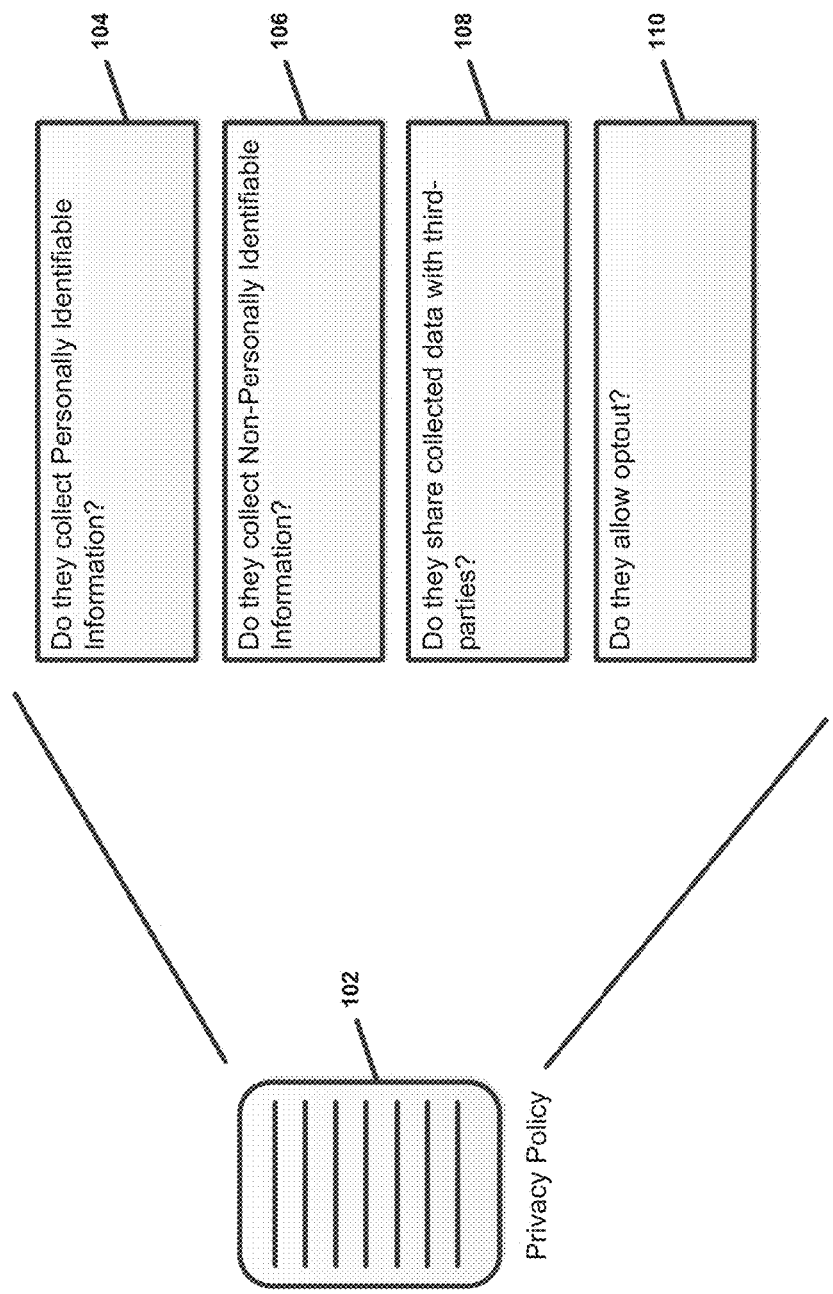
FIG. 1 schematically depicts categories associated with an exemplary top-level category according to one embodiment.

In general, any text (e.g., a legal document, a sentence, etc.) can define a policy. The text can be classified using top-level categories, and in effect, the text may form a license agreement, a privacy policy, a rental agreement, etc. FIG. 1 illustrates the top-level category privacy policy 102, which describes what a provider of a website may or may not do with respect to the information obtained from a visitor to the website. The information may be obtained directly, by requesting the user to provide information such as name, address, etc., and/or may be obtained indirectly, e.g., by analyzing user's actions on the website.

Various categories are associated with the top-level category 102. These include collection of personally identifiable information 104, collection of non-personally-identifiable information 106, sharing of collected data 108, and the option to optout 110. Various subcategories may also be associated with one or more of these categories. For example, the category sharing of collected data 108 may relate to a subcategory sharing personally-identifiable information or to a subcategory sharing non-personally-identifiable information only. Similarly, the category option to optout 110 may be related to a subcategory opting out of sharing collected data only or to a subcategory opting out of data collection itself.

Figure 2:
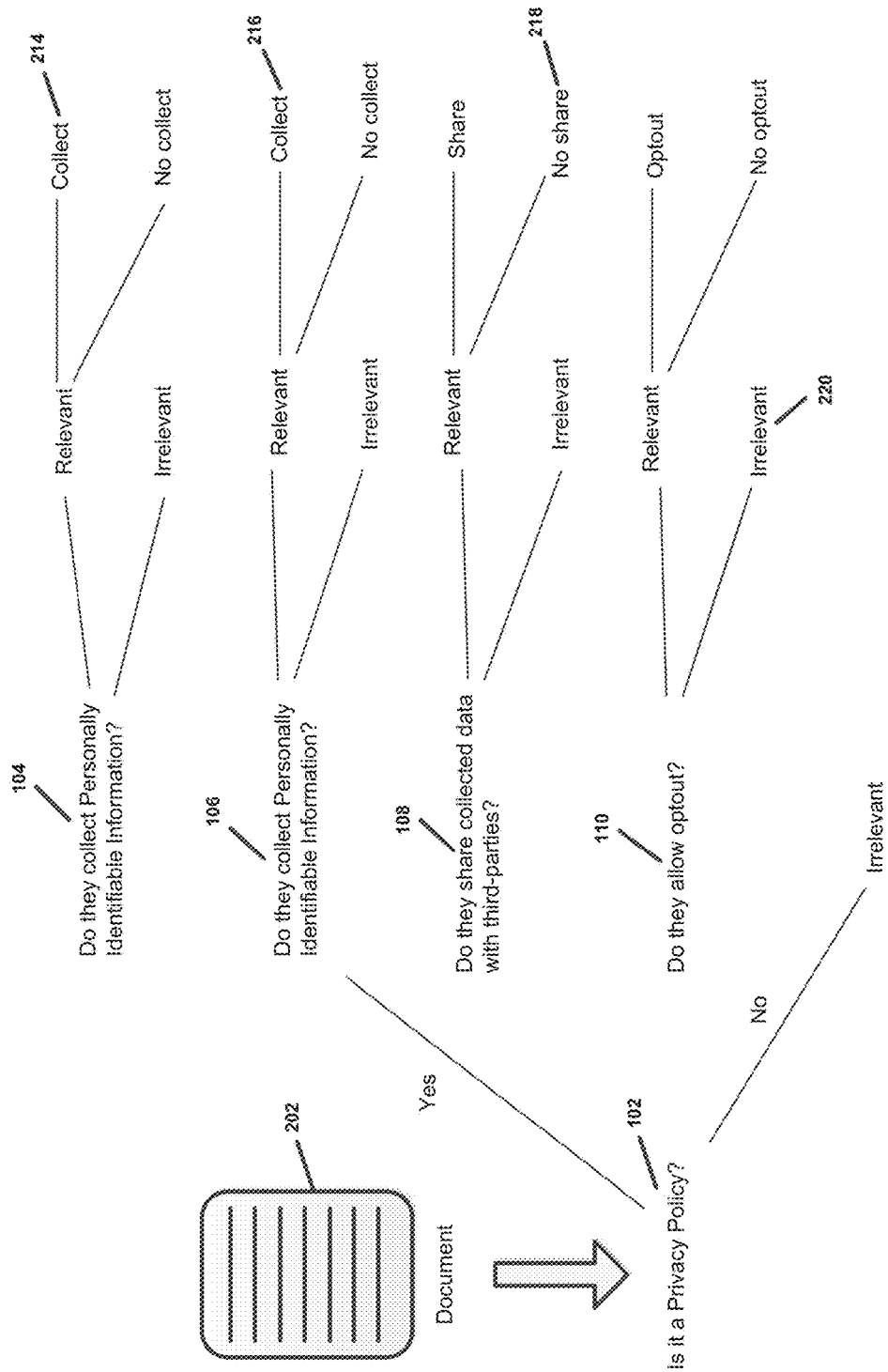
FIG. 2 schematically depicts a taxonomy of categories and subcategories associated with an exemplary top-level category, and values associated with those categories and subcategories, according to one embodiment.

FIG. 2 schematically depicts a taxonomy model based on various categories and value options. The document 202 may include the privacy policy 102 described with reference to FIG. 1. Default values may also be associated with one or more of these categories and subcategories such as defaults for both collection of personally identifiable information 104 and collection of non-personally identifiable information 106 may be true 214, 216, and the default for sharing of collected data 108 may be false 218. The optout 110 is not relevant 220 to sharing of collected data, but it can be relevant to the collection of personally-identifiable and/or non-personally-identifiable information.

Figure 3:
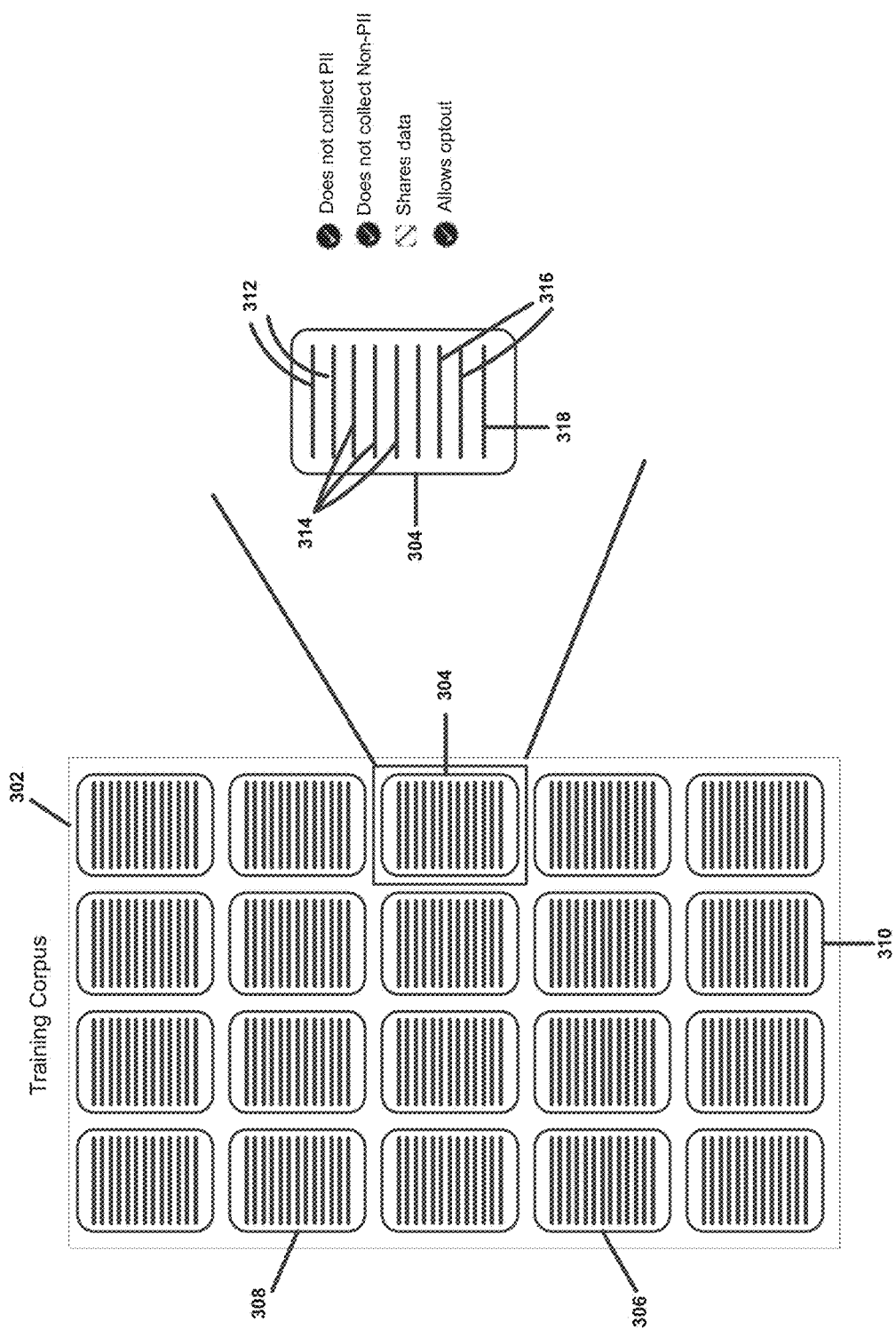
FIG. 3 schematically illustrates a training corpus for training a policy extraction system according to one embodiment.

Training data are prepared to build a Natural Language Processing (NLP) model for a classifier that can determine if a text belongs to a certain category in the taxonomy. With reference to FIG. 3, in general, if a classifier is being trained for a certain category and/or subcategory, the training data include documents and/or statements associated with that category/subcategory, and optionally, values related to that category/subcategory. For example, the training corpus 302 includes various pieces of known text such as 304, 306, 308, 310, etc. The text 304 has a portion 312 that describes that personally-identifiable information is not collected. A portion 314 describes that non-personally-identifiable information is also not collected. A portion 316 describes that collected data may be shared. While there may be no data to be shared, if none is collected, the text 304 can be used to train the classifiers. Another portion 318 of the text 304 describes that a user may opt out of sharing the collected information.

The other pieces of text 306, 308, 310, etc. may include text related to one or more of the categories and subcategories related to the top-level category and may include corresponding values. Some portions of a piece of text (e.g., text 306) may not be relevant to any category or subcategory at all. The classifier may be trained to correctly recognize the categories present in each piece of text and the associated values. Moreover, if a classifier incorrectly determines that a portion of text that does not contain any policy information as being relevant to a certain category/subcategory, the classifier may be adjusted so as to correct this error.

Figure 4:
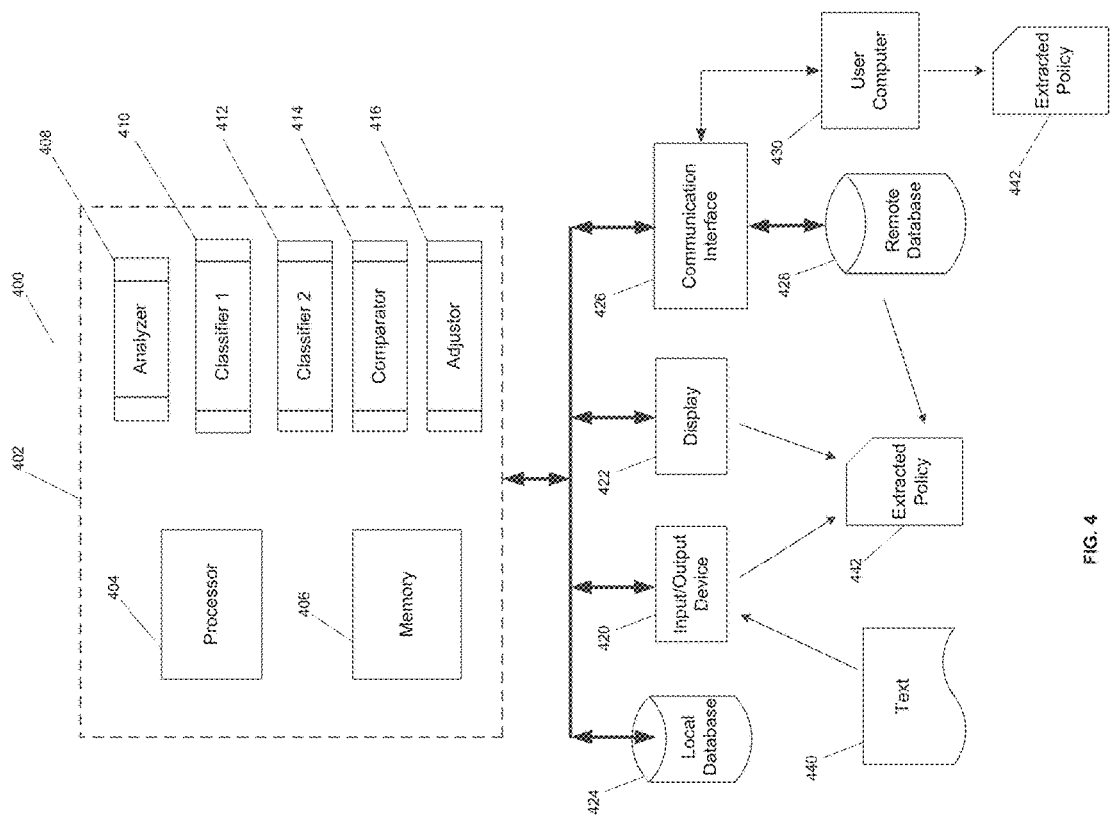
FIG. 4 schematically depicts a policy extraction system according to one embodiment.

As depicted in FIG. 4, once calibrated (i.e., trained), a legal advisory system 400 can extract information pertaining to various duties, requirements, consents, etc. from text, and present the extracted information to a user in a concise, easy to understand manner. The system 400 includes a processor 404 and memory 406. The processor can be configured as one or more of an analyzer 408, classifiers 410, 412, a comparator 414, and an adjustor 416. One or more of these components may also be provided as hardware components such as logic circuitry, custom ASIC, FPGA, etc. The processor and the memory are in communication with an input/output device 420 (e.g., a keyboard, mouse, printer, thumb drive, etc.), a display 422, a local database 424, and a communication interface 426. The communication interface may be in communication with a remote database 428 and alternatively or in addition, with a user computer 430.

The system 400 receives text 440 (e.g., a document, text at a website, etc.) via the input/output device 420. The text is analyzed and the policy information, if provided therein, is extracted as described above, using analyzer 408 and the classifiers 410, 412. The advisory system may issue a list of values for each category/subcategory. It should be understood that systems having only one classifier or more than two classifiers are also within the scope of the invention. One classifier (e.g., Classifier 1 410) may be associated with one or more categories, and another classifier (e.g., Classifier 2 420) may be associated with one or more subcategories. Alternatively, for each category a dedicated classifier may be associated therewith, and for each subcategory a dedicated classifier may be associated therewith as well.

The extracted policy 442 may be output using the input/output device 420 and/or may be stored in the local database 424. Alternatively or in addition the extracted policy 442 may be stored at the remote database 428 via the communication interface 426. In some embodiments, the extracted policy 442 is displayed to a user on the display 422 and in other embodiments, the extracted policy 422 is transmitted via the communication interface 426 to a user's computer 430, and displayed thereon. Depending on the input received from the user, the processor may allow continued access to the source from which the text was obtained—such as an online store or a social media site, etc, or may block access to that source.

In the training mode, the processor is additionally configured to operate as a comparator 414 and/or an adjustor 416. These components may also be provided as hardware component, as described above. The text 440 includes a known policy, and the information extracted using the analyzer 408 and the classifiers 410, 412 is compared with the known policy information, using the comparator 414. If there is a mismatch, or if the analyzer and/or classifiers determine that a portion of the text 440 is relevant to a top-level category, category, or subcategory when that portion is not relevant, the analyzer 408 and the classifiers 410, 412 can be adjusted to correct these errors.

Figure 5:
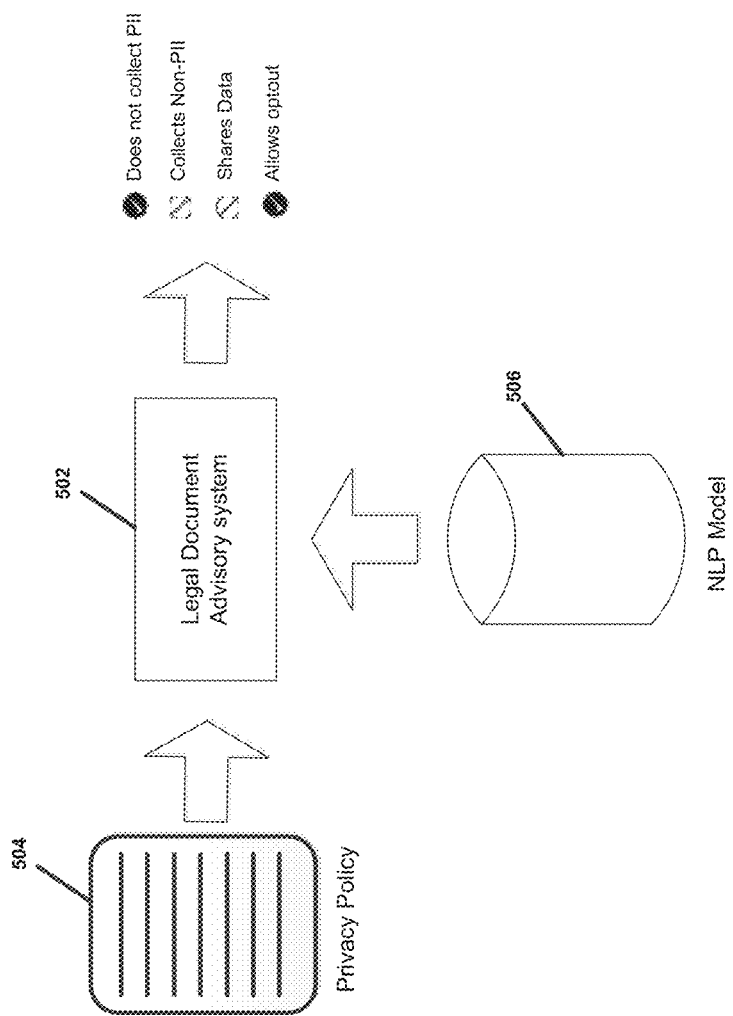
FIG. 5 illustrates operation of an exemplary policy extraction system according to one embodiment.

With reference to FIG. 5, the legal document advisory system 502 receives text 504 that includes policy information. The system 502 extracts and summarizes the policy information using a natural language processing (NLP) model 506. The NLP model may be incorporated into the legal advisory system 502 by configuring a processor and/or may be provided as hardware components, as described above. The exemplary extracted policy is displayed to a user in a concise manner, informing the user that personally-identifiable information is not collected, but non-personally-identifiable information is collected and shared. The user has the option to opt out from the collection and/or sharing of the non personally identifiable information.

Example 1: Do Not Track

In this example the automatic legal advisory system is run on privacy policies of trackers, i.e., websites that collect personally identifiable information and/or non-personally identifiable information about visitors of other websites. The trackers often retain the collected data and transfer the data to third parties. The automatic legal advisory system extracts privacy policy information related to the tracker and stores it into a centralized and/or distributed database.

The policy information is extracted as described above, and is presented to the web surfer along with the web page that is being tracked by a tracker. Thus, the web surfer is no longer unaware of what the tracker tracks at this particular web page. In order to learn the tracker's policies, however, the web surfer is not required to read the entire text of the privacy policy of the tracker. The web surfer is then given a choice to disable a particular tracker. Once the web surfer has made a decision, the automatic legal advisory system may take necessary action by disabling access to the website or a portion thereof, etc.

If there are any errors in the process of extracting policy information from the privacy policy of a tracker, the tracker can facilitate the resolution of the errors by submitting corrections as described above.

Example 2: Safe Web Browser

In this example the automatic legal advisory process is built into a web browser. The privacy advisory process extracts privacy policy information and presents it to a web surfer as soon as the user is confronted with a requirement to accept or decline a privacy policy on a website the user visits. The policy information is extracted as described above, and is presented to the web surfer along with the web page seeking compliance with the policy. The web surfer, however, is not required to read the entire text of the privacy policy at the web page. Once the web surfer has made a choice to either accept or decline the privacy policy, based on the information presented by the advisory system, the system may take necessary action. For example, the system may grant or deny the website access to the user's private information.

Example 3: Ad-Hoc Extraction of Information

In Example 1, the automatic legal advisory system stores the extracted information into a centralized and/or distributed database, and then presents it to the user. In this example, however, the legal advisory system extracts information in an ad-hoc manner. The user may visit an e-commerce website to purchase a product and/or service. During the purchase, the website presents an End User License Agreement (EULA) to the user, requesting the user to agree to the terms and conditions of the EULA. It should be understood that the EULA is for illustrative purposes only, and that the legal advisory system can extract information from any text, e.g., a document such as a contract, a lease, a policy, etc., and/or from a sentence.

The legal advisory system scans the EULA and determines that the EULA is a license. The system then identifies various categories of the EULA and values associated with those categories. For example, the legal advisory system may determine that according to the EULA the vendor may store the user's credit-card information, may provide different levels of service for different fees, may automatically renew the use's subscription, etc. A score card, such as that shown in FIG. 4, is then presented to the user. In this mode, the legal advisory system, instead of presenting extracted information that is stored in a database, extracts information on the fly (e.g., when a user accesses a website), and then presents it to the user, enabling the user to make an informed decision.

The embodiments described herein open up several possibilities that were not available before. First, automatic extraction of policy information allows coping with the growing number of privacy domains (such as websites, applications, or devices) and their legal documents. Furthermore, automatic extraction allows a user not only to be informed about policy information upon entering a privacy domain, but also to stay informed about all updates in the legal documents of a domain the user has already entered.

Second, automatic extraction of policy information can improve transparency and interoperability. In other words, it becomes possible to present information contained in a legal document to a user in a more readable way, and exchange of privacy information with other software systems, software applications, software components, devices, and hardware systems is also enabled. The extraction of information can be performed in real time, i.e., about when the text is presented to the user (as described in Example 3) or off-line (e.g., as described in Example 1). However, the extracted information is presented to the user in real time, i.e., when the user visits a privacy domain with which the extracted information is associated.

Each functional component described above may be implemented as stand-alone software components or as a single functional module. In some embodiments the components may set aside portions of a computer's random access memory to provide control logic that affects one or more of the analyzing, determining, extracting, storing, transmitting, displaying, receiving instruction, taking an action, comparing, and adjusting steps described above. In such an embodiment, the program or programs may be written in any one of a number of high-level languages, such as FORTRAN, PASCAL, C, C++, C#, Java, Tcl, PERL, or BASIC. Further, the program can be written in a script, macro, or functionality embedded in commercially available software, such as EXCEL or VISUAL BASIC.

Additionally, the software may be implemented in an assembly language directed to a microprocessor resident on a computer. For example, the software can be implemented in Intel 80x86 assembly language if it is configured to run on an IBM PC or PC clone. The software may be embedded on an article of manufacture including, but not limited to, computer-readable program means such as a floppy disk, a hard disk, an optical disk, a magnetic tape, a PROM, an EPROM, or CD-ROM.

The invention can be embodied in other specific forms without departing from the spirit or essential characteristics thereof. The foregoing embodiments are therefore to be considered in all respects illustrative rather than limiting on the invention described herein.

What is claimed is:

1. A method of extracting privacy policy information for a website from its text, the method comprising:
   by a processor, determining using statistical classification whether the text is relevant to the website privacy policy;
   when the text is determined to be relevant to the privacy policy, determining, by the processor, whether at least a portion of the text is relevant to a category within a taxonomy of categories related to the privacy policy;
   when at least a portion of the text is determined to be relevant to the category, extracting from the text, using a first classifier, privacy policy information associated with the category;
   by the processor, deriving data based on the extracted privacy policy information, the data being a subset of the privacy policy and providing a summary of the privacy policy that includes the website's policies regarding collection of personally-identifiable information, collection of non-personally-identifiable information, sharing of collected information, and permission to opt-out, wherein the summary of the privacy policy, when presented to a user, obviates the need for the user to read the entire text of the privacy policy such as portions of the privacy policy concerning matters other than the policies on the collection of personally-identifiable information, the collection of non-personally-identifiable information, the sharing of collected information, and the permission to opt-out;
   using the processor, presenting to the user when the user visits the website, the data along with a user prompt to accept or decline the privacy policy; and
   by the processor, restricting access to at least a portion of the website when an instruction is received, in response to the presented data, to decline the privacy policy.

2. The method of claim 1, further comprising extracting from the relevant portion of the text, using a second classifier, policy information associated with a subcategory within the taxonomy, the subcategory being related to the category.

3. The method of claim 2, wherein the subcategory is related to collecting personally-identifiable information, and the subcategory is selected from the group consisting of collection of name, collection of address, collection of email address, and collection of ("Internet Protocol") IP address.

4. The method of claim 1, wherein the text comprises one of a sentence and a document.

5. The method of claim 1, wherein at least one of analyzing, determining, and extracting comprises machine learning by the processor.

6. The method of claim 1, wherein at least one of analyzing, determining, and extracting comprises natural language processing.

7. The method of claim 1, wherein extracting the policy information using the first classifier comprises employing statistical classification.

8. The method of claim 7, wherein at least one of the statistical classification used during analyzing the text and the statistical classification employed during extracting the policy information comprises at least one of multinomial logistic regression, word profile similarity comparison, naive Bayes classification, k-nearest neighbor classification, and maximal likelihood based classification.

9. The method of claim 1, wherein the category is selected from the group consisting of collecting personally-identifiable information, collecting non-personally-identifiable information, sharing collected information, and allowing opt-out.

10. The method of claim 1, further comprising:
    storing the extracted policy information in a database; and
    transmitting the stored policy information.

11. The method of claim 10, wherein the database comprises at least one of a local database and a distributed database.

12. The method of claim 1, wherein the statistical classification includes at least one of machine learning and natural language processing.

13. The method of claim 1, further comprising permitting, by the processor, access to the website when an instruction is received, in response to the presented data, to accept the privacy policy.

14. The method of claim 1, further comprising:
    detecting a requirement by the website that a user accept or decline the privacy policy, wherein deriving and presenting the data is effected in response to the requirement.

15. The method of claim 1, wherein the summary of the privacy policy includes information on the category within the taxonomy of categories.

16. A system for extracting privacy policy information for a website from its text, the system comprising:
    at least one storage medium, at least one of the at least one storage medium storing the text; and
    a processor configured, by instructions stored in at least one of the at least one storage medium, as:
    (i) an analyzer operative to (a) determine using statistical classification if the text is relevant to the website privacy policy and (b) when the text is determined to be relevant to the privacy policy, determine whether at least a portion of the text is relevant to a category within a taxonomy of categories related to the privacy policy; and
    (ii) a first classifier operative to extract, from the text, privacy policy information associated with the category, when at least a portion of the text is determined to be relevant to the category, wherein the processor is configured to derive data based on the extracted privacy policy information, present to a user when the user visits the website, the data along with a user prompt to accept or decline the privacy policy, and restrict access to at least a portion of the website when an instruction is received, in response to the presented data, to decline the privacy policy, the data being a subset of the privacy policy and providing a summary of the privacy policy that includes the website's policies regarding collection of personally-identifiable information, collection of non-personally-identifiable information, sharing of collected information, and permission to opt-out, wherein the summary of the privacy policy, when presented to the user, obviates the need for the user to read the entire text of the privacy policy such as portions of the privacy policy concerning matters other than the policies on the collection of personally-identifiable information, the collection of non-personally-identifiable information, the sharing of collected information, and the permission to opt-out.

17. The system of claim 16, wherein the processor is further configured as a second classifier operative to extract, from the relevant portion of the text, policy information associated with a subcategory within the taxonomy, the subcategory being related to the category.

18. The system of claim 17, wherein the subcategory is related to collecting personally-identifiable information, and the subcategory is selected from the group consisting of collection of name, collection of address, collection of email address, and collection of IP address.

19. The system of claim 16, wherein the text comprises one of a sentence and a document.

20. The system of claim 16, wherein at least one of the analyzer and the first classifier is configured for machine learning.

21. The system of claim 16, wherein at least one of the analyzer and the first classifier is configured for natural language processing.

22. The system of claim 16, wherein the first classifier employs statistical classification.

23. The system of claim 22, wherein at least one of the statistical classification used by the analyzer and the statistical classification employed by the first classifier comprises at least one of multinomial logistic regression, word profile similarity comparison, naive Bayes classification, k-nearest neighbor classification, and maximal likelihood based classification.

24. The system of claim 16, wherein the category is selected from the group consisting of collecting personally-identifiable information, collecting non-personally-identifiable information, sharing collected information, and allowing opt-out.

25. The system of claim 16, wherein the processor is further configured to:
store the extracted policy information in a database; and
transmit the stored policy information.

26. The system of claim 25, wherein the database comprises at least one of a local database and a distributed database.

27. The system of claim 16, wherein the processor is further configured to adjust the first classifier.

28. The system of claim 16, wherein the statistical classification includes at least one of machine learning and natural language processing.

29. The system of claim 16, wherein the processor is further configured to permit access to the website when an instruction is received, in response to the presented data, to accept the privacy policy.

30. The system of claim 16, wherein the summary of the privacy policy includes information on the category within the taxonomy of categories.

31. A method of extracting privacy policy information for a website from its text, the method comprising:
by a processor, determining using statistical classification whether the text is relevant to the website privacy policy;
when the text is determined to be relevant to the privacy policy, determining, by the processor, whether at least a portion of the text is relevant to a category within a taxonomy of categories related to the privacy policy;
when at least a portion of the text is determined to be relevant to the category, extracting from the text, using a first classifier, privacy policy information associated with the category;
by the processor, deriving data based on the extracted privacy policy information, the data being a subset of the privacy policy and providing a summary of the privacy policy that includes the website's policies regarding collection of personally-identifiable information, collection of non-personally-identifiable information, sharing of collected information, and permission to opt-out, wherein the summary of the privacy policy, when presented to a user, obviates the need for the user to read the entire text of the privacy policy such as portions of the privacy policy concerning matters other than the policies on the collection of personally-identifiable information, the collection of non-personally-identifiable information, the sharing of collected information, and the permission to opt-out;
using the processor, presenting to the user in real-time the data along with a user prompt to accept or decline the privacy policy; and
by the processor, restricting access to at least a portion of the website when an instruction is received, in response to the presented data, to decline the privacy policy.

32. A system for extracting privacy policy information for a website from its text, the system comprising:
at least one storage medium, at least one of the at least one storage medium storing the text; and
a processor configured, by instructions stored in at least one of the at least one storage medium, as:
(i) an analyzer operative to (a) determine using statistical classification if the text is relevant to the website privacy policy and (b) when the text is determined to be relevant to the privacy policy, determine whether at least a portion of the text is relevant to a category within a taxonomy of categories related to the privacy policy; and
(ii) a first classifier operative to extract, from the text, privacy policy information associated with the category, when at least a portion of the text is determined to be relevant to the category, wherein the processor is configured to derive data based on the extracted privacy policy information, present to a user in real-time the data along with a user prompt to accept or decline the privacy policy, and restrict access to at least a portion of the website when an instruction is received, in response to the presented data, to decline the privacy policy, the data being a subset of the privacy policy and providing a summary of the privacy policy that includes the website's policies regarding collection of personally-identifiable information, collection of non-personally-identifiable information, sharing of collected information, and permission to opt-out, wherein the summary of the privacy policy, when presented to the user, obviates the need for the user to read the entire text of the privacy policy such as portions of the privacy policy concerning matters other than the policies on the collection of personally-identifiable information, the collection of non-personally-identifiable information, the sharing of collected information, and the permission to opt-out.

* * * * *